United States Patent Office 3,556,651
Patented Jan. 19, 1971

3,556,651
CARD HANDLING APPARATUS
Edward J. Lavander, Rochester, N.Y., assignor to Xerox Corporation, Rochester, N.Y., a corporation of New York
Filed Oct. 24, 1968, Ser. No. 770,366
Int. Cl. G03b 23/12
U.S. Cl. 353—26     4 Claims

ABSTRACT OF THE DISCLOSURE

Apparatus for automatically handling microfilm data cards during optical scanning on a carriage. A card locking clutch assembly is mounted on the carriage to enable each card to be positioned and firmly held during the scanning operation and released thereafter.

---

This invention relates to improvements in microfilm projection apparatus and particularly, to improvements in apparatus for automatically handling microfilm mounted in data processing cards in optical scanning devices.

This widely accepted use of microfilm as a means for storing information has not only increased the use of microfilm but has also increased the need for various forms of handling the microfilm expeditiously especially in the duplicator/copier field. Specifically, this invention relates to automatic handling of data processing cards wherein a stack of cards having microfilm mounted in the aperture thereof is fed to an improved microfilm projection apparatus that scans the microfilm and projects a light image of the microfilm onto a revolving electrostatic recording drum. The data processing cards, herein referred to as aperture cards, contain one or more reproducible images on a strip of microfilm. The automatic card handling apparatus must be capable of selectively positioning the aperture card so that the proper image, or images may be projected onto the electrostatic recording surface many times to produce multiple copies of the same image. The present invention enables a microfilm feeder and projector to be fully automatic and reliable and is also intended as an improvement over the microfilm handling mechanism disclosed in U.S. Pat. 3,172,202 to Rutkus, Jr., et al.

It is therefore an object of this invention to improve optical scanning and projection apparatus for use with aperture cards.

It is a further object of this invention to improve automatic card feeder and ejector mechanism for use with optical scanning and projector apparatus.

It is a further object of this invention to improve scanning and projection apparatus so that a card carriage containing a data processing card with microfilm therein may be automatically fed and positioned within the projection apparatus to selectively scan the microfilm many times to produce multiple copies of the film without requiring a manual alignment of the film by the operator.

These and other objects of this invention are attained by arranging a card locking clutch assembly on a movable carriage mounted on a projector in such a manner as to enable a card to be positioned and firmly held during the scanning operation and released thereafter. An automatic card transport for feeding cards seriatim to the card carriage is operatively associated with the carriage and card locking clutch member whereby each card is registered, scanned and ejected automatically.

For a better understanding of the invention as well as other objects and further features thereof, reference is had to the following detailed description of the invention to be read in connection with the accompanying drawings, wherein:

FIG. 1A is an end view taken along line 1A—1A of FIG. 1 illustrating details of the optical system;

Figure 1:
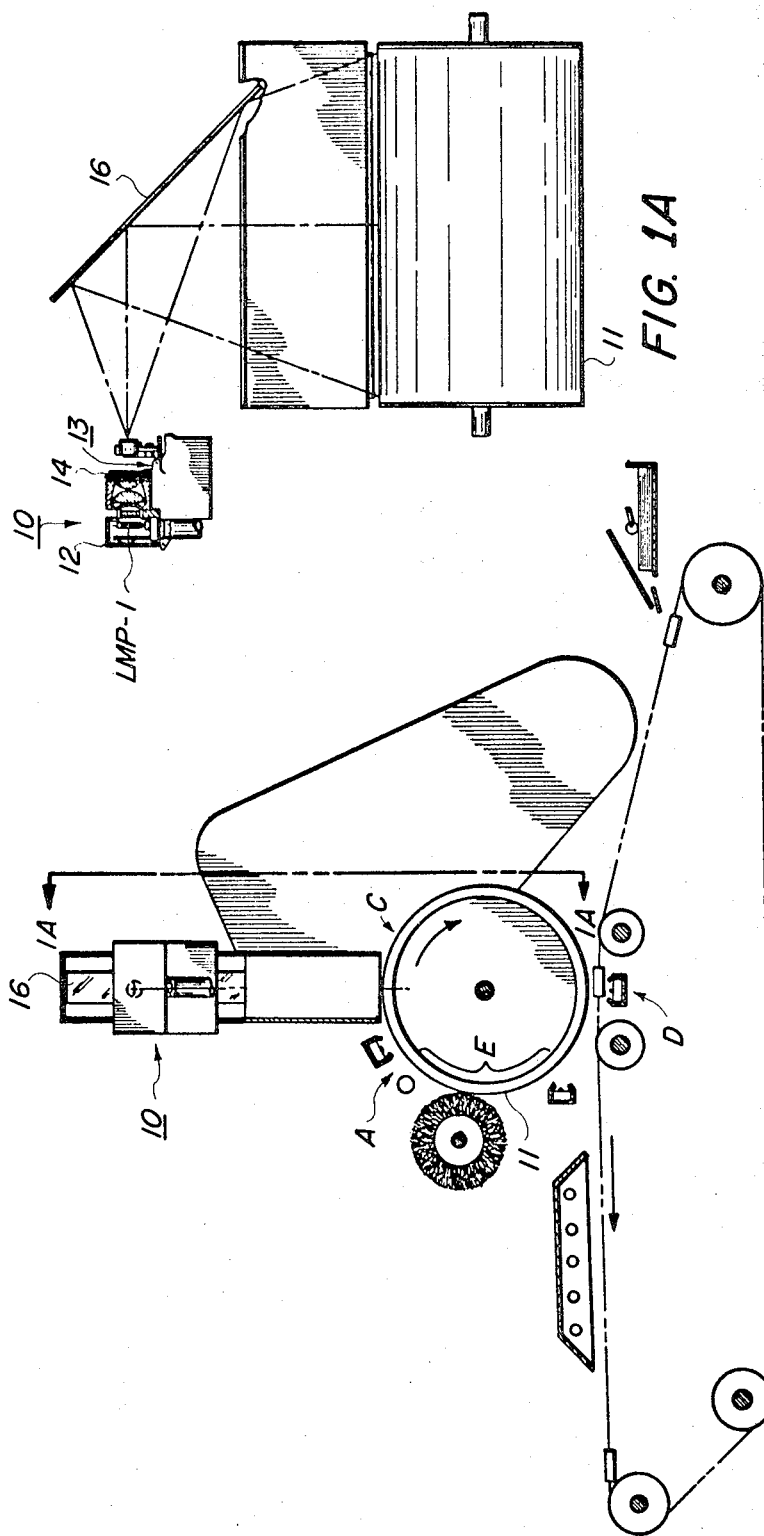
FIG. 1 is a schematic of a copier/duplicator machine incorporating card handling apparatus according to the present invention.

Shown in FIG. 1 is an automatic continuous recording machine adapted for use with a microfilm card projection and handling apparatus designated 10 and constructed in accordance with the instant invention. The recording machine comprises an electrostatic recording member including a photoconductive layer or light-receiving surface on a conductive backing formed in the shape of a drum, generally designated by numeral 11. As is normal in machines of this type, the drum is journaled in a frame to rotate in the direction indicated by the arrow to cause the drum surface sequentially to pass a plurality of processing stations. The processing stations of this machine, are described more fully in the aforementioned Rutkus patent. For the purpose of the present disclosure, the several processing stations in the path of movement of the recording surface for each machine may be briefly described as follows:

A charging station A, at which a uniform electrostatic charge is deposited on the photoconductive layer of the drum;

An exposure station B, at which the light or radiation pattern of information to be reproduced is projected onto the drum surface to dissipate the drum charge in the exposed areas thereof to thereby leave a latent electrostatic image.

A developing station C, at which developing material, including toner particles having an electrostatic charge opposite to that of the electrostatic latent image, are cascaded across the drum surface, whereby the toner particles adhere to the electrostatic latent image to form powdered image in the configuration of the information being reproduced;

A transfer station D, at which the powder image is electrostatically transferred from the drum surface to a transfer material or a support surface; and A drum cleaning and discharge station E, at which the drum surface is brushed to remove residual toner particles remaining thereon after image transfer, and at which the drum surface is exposed to a relatively bright light source to effect substantially complete discharge of any residual electrostatic charge remaining thereon.

The apparatus of the instant invention is an improvement for microfilm projection systems and is adapted for incorporation in the microfilm card projection and card handling apparatus of the type described in the aforementioned copending application. It should be understood, however, that the apparatus of the invention, can be utilized in other suitable systems. Specifically, the optical scanning or projection system includes a projector 12 having a movable carriage 13 for transporting a microfilm data card 14 in light projecting relation to the moving light sensitive recording surface. Uniform lighting of a microfilm data card 14 is provided by means of a projection lamp LMP–1. The optical system includes an image mirror 16 mounted in a light shield frame. The microfilm data card supported by a movable carriage of the projector is arranged for movement in a path to transverse the optical path in reverse direction whereby the film is scanned in timed relation to the movement of the light receiving recording surface to project a light image corresponding to the film onto the surface of the drum. After projection of the desired number of light images, the card is ejected from the card carriage and is deposited in a receiving magazine as will be more fully understood hereinafter.

Referring now to FIGS. 2–9, card handling apparatus 10 comprises a card magazine assembly 18 that includes vertical guide members 20 for holdig a stack of cards in alignment. The magazine is arranged to permit the feeding of cards from the front of the card stack. A backing plate 22 urged by a pair of negator springs 24 urges the cards against the feed block 26.

For moving each card out of the magazine, the apparatus includes a movable feed block 26 and is provided with an adjustable pickerknife 28 that is arranged to engage the leading edge of the first card of the stack. Feed block 26 is mounted in suitable ways for sliding movement toward and away from the exit slot of the magazine, and is actuated by an arm 30 of rotary solenoid SOL–1 in timed relation to the operation of the remainder of the card handling apparatus. The feed block 30 is returned by a spring 32 mounted at the base thereof.

As each card leaves magazine 18, it is gripped by a set of feed rolls 40 and 42 and advanced downwardly to card carriarge 13. For this purpose, both set feed rolls 40 and 42 are journaled for rotation in side plates 44 and 46. The resilient rolls 40 are driven clockwise and are urged into engagement with the inner rolls 42. For driving the feed rolls 40, the shaft 48 thereof extends through bracket 44 and is connected to the suitable driving gears 50, 51 that rotate continuously while the apparatus is in operation. The gears 50, 51 and therefore the rolls 40 are driven by motor MOT–2. The card is then advanced to the carriage which at this point of operation is directly aligned with the feed rolls to receive the card. As the card is conveyed from the feed rolls 40 and 42, it is registered against a stop 53.

Immediately thereafter, the card carriage 13 is moved in a path of movement normal to the card feeding movement, to effect the scanning operation. After the microfilm data is scanned, the carriage 13 is returned to a position in alignment with the feed rolls and the card is ejected or not depending on the number of copies desired as will become more apparent. For ejection, the card is engaged by the eject feed rolls 56 that are rotatably mounted on shaft 57 carried on a pivot arm 58, pivoted in a plate 60 by a shaft 61 which is resiliently urged out of contact with the card by a spring 62. The shaft 57 is continuously rotated by a flexible drive shaft 59 through suitable gears 63 and 65 powered by a motor MOT–1. A solenoid SOL–2 actuates an arm 64 which is rigidly secured to shaft 61 and thereby actuates the eject rolls 56. The continued driving action of eject rolls 56 is thereby effective to eject the card when SOL–2 is actuated. The card comes to rest in receiving magazine 68.

When the supply of cards in card magazine 18 becomes exhausted, means are provided to stop the machine. For this purpose, a "last card" limit switch 1–LS is mounted on the side plate 70. This switch functions in conjunction with the remainder of the electrical circuit to keep the several operating circuits energized as long as switch 1-LS is actuated during the period in which cards remain for feeding to the carriage 13. For this purpose, switch- actuating element 72 extends through an opening 73 formed in the frame. Engagement of each card with actuating element 72 serves to maintain the desired circuitry energized. When the last card is fed the switch 1–LS is deenergized and the circuit is thereby broken to allow the machine to come to the standby mode and after a specified length of time shut down.

Figure 2:
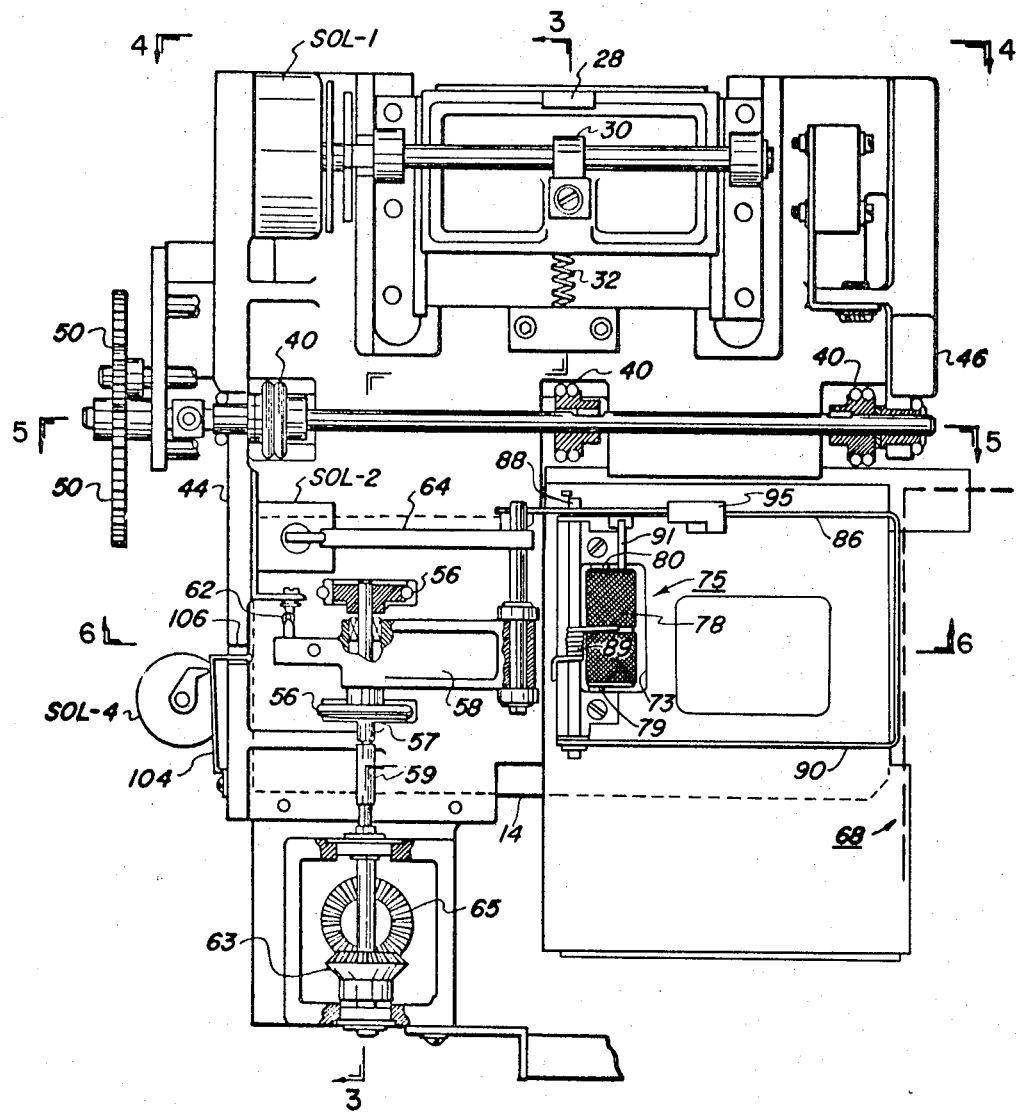
FIG. 2 is a front view of the card handling apparatus.
Figure 2A:
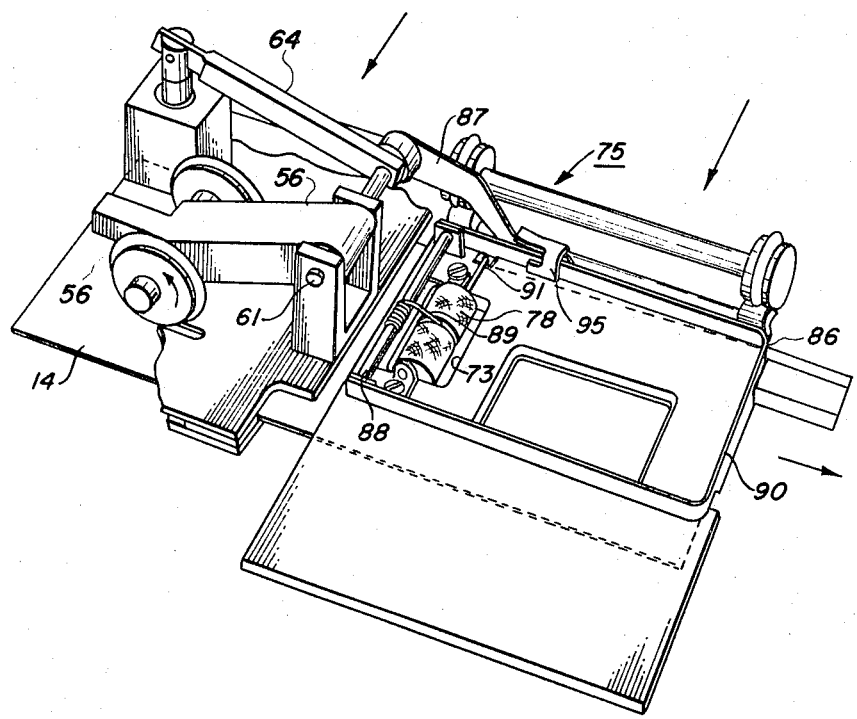
FIG. 2A is a perspective view of the card handling apparatus illustrating details of the card locking clutch assembly.
Figure 3:
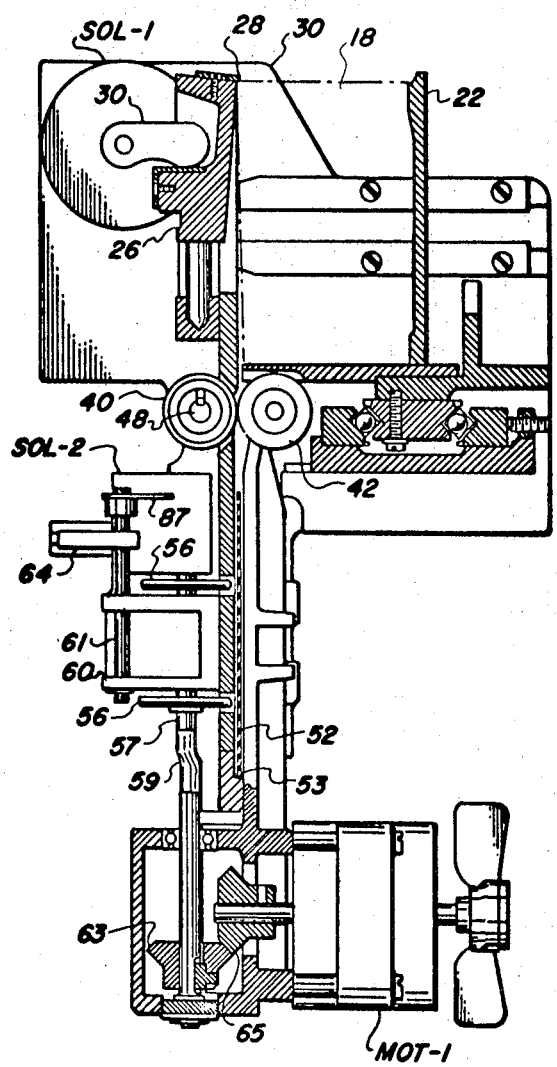
FIG. 3 is a sectional view of the card handling apparatus taken along line 3—3 of FIG. 2.
Figure 4:
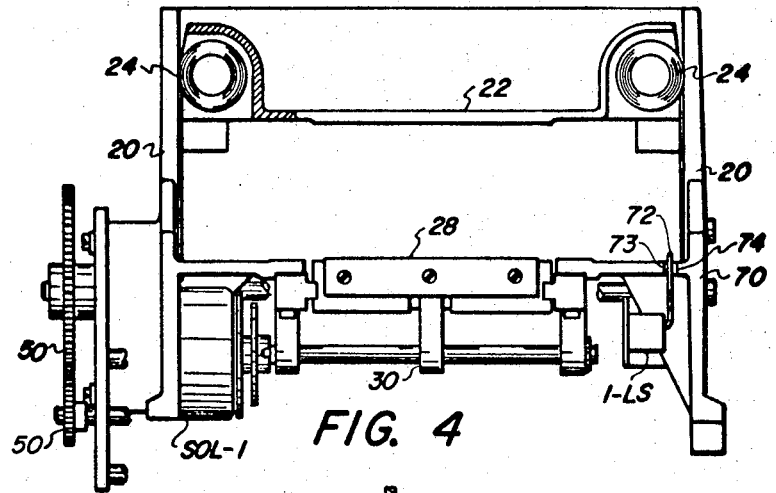
FIG. 4 is a top view of the card handling apparatus taken along 4—4 of FIG. 2.
Figure 5:
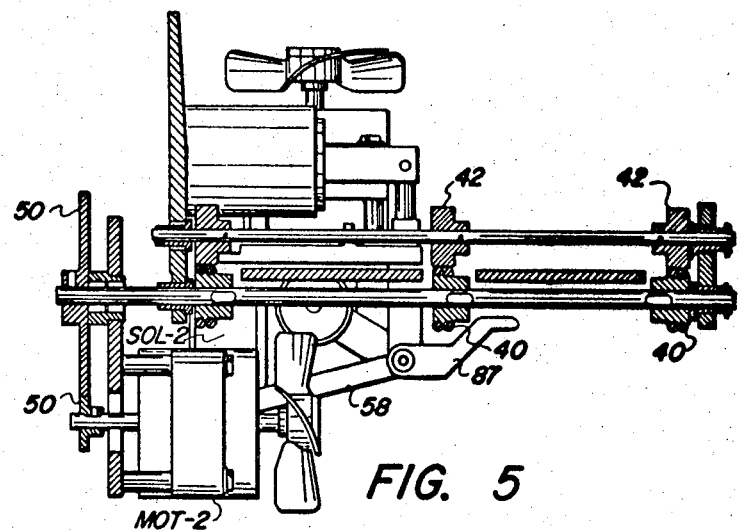
FIG. 5 is a sectional view of the card handling apparatus taken along line 5—5 of FIG. 2.
Figure 6:
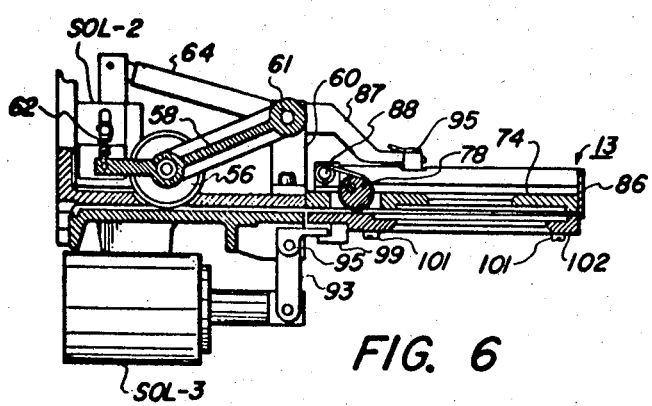
FIG. 6 is a sectional view of the card handling apparatus taken along line 6—6 of FIG. 2.
Figure 7:
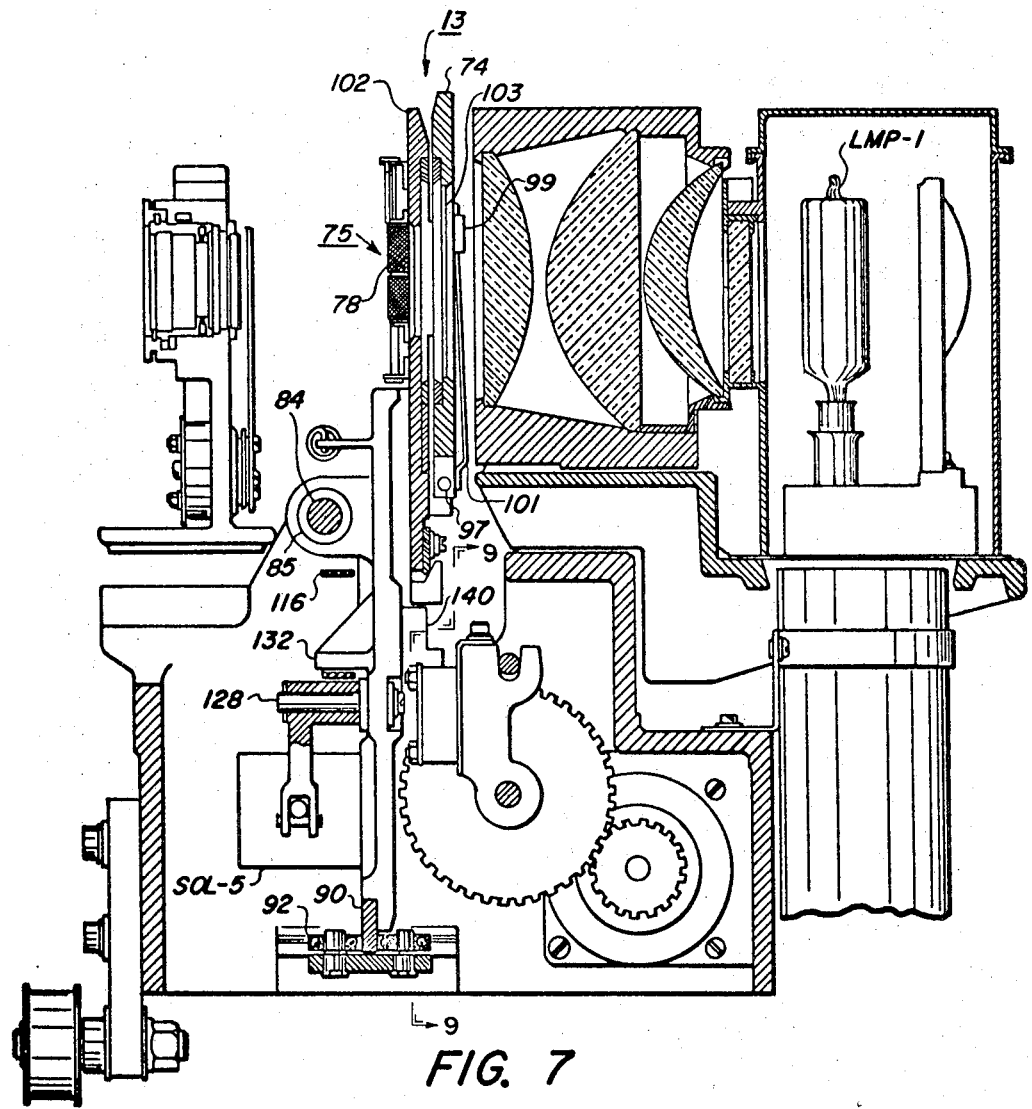
FIG. 7 is a right-hand side view of the projector for projecting microfilm images partly in section and with parts removed for clarity.
Figure 8:
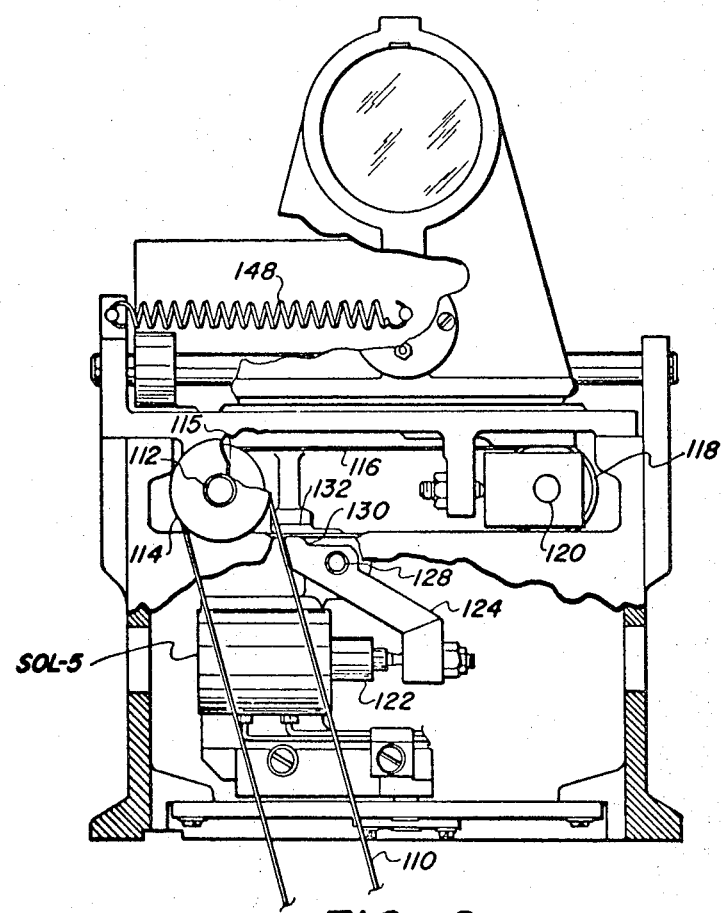
FIG. 8 is a front view of the projector partly in section with parts removed for clarity.
Figure 9:
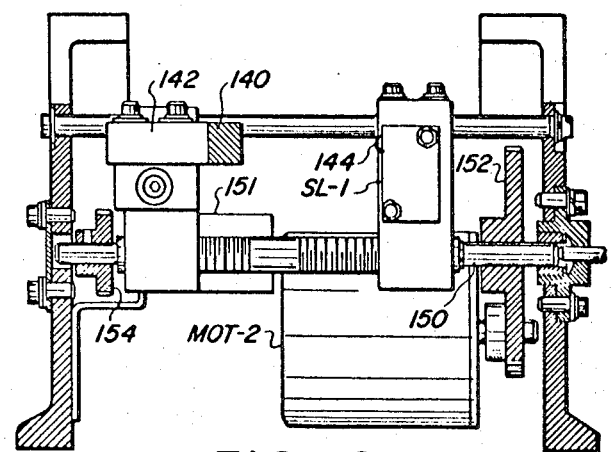
FIG. 9 is a sectional view of the projector taken along line 9—9 of FIG. 7.

In accordance with the present invention, card carriage 13 receives each microfilm data card from the feed rolls and carries it through the scaning cycle, i.e., the exposure stroke and the return stroke, during continuous operation of the remaining portions of the machine, and is capable of making multiple copies of the same image automatically by utilizing a card locking clutch assembly 75 (FIG. 2a) as will become more apparent. In the normal operation of the system, carriage 13 is positioned at the start of its scan stroke of movement in which it is in register with the card magazine assembly 18. When the operation is started, carriage 13 is in a position in register with feed rolls 40 and 42 of the card magazine assembly to receive the next card for reproduction. The carriage is held in this position to permit the ejection of a card after the desired number of copies are produced and to receive a new card and to effect the several mechanical movements and electrical circuit connections of the card handling operation in proper sequence. Card carriage 13 includes the vertically disposed card carriage that is formed of a casting having a flat platen 74 for supporting cards and a vertically disposed gate to which the carriage is secured along its bottom edge. The carriage is adapted for lateral movement on a shaft 84 which extends within the bushings 85. The lower portion 90 of carriage 13 is guided by a pair of stabilized bearings 92 and 94 secured to the base. By this structure, carriage 13 is supported for movement on the shaft 84 while maintaining its card supporting surface in a vertical position throughout its path of movement.

For guiding microfilm data cards onto the platen 74 in accordance with the invention a U-shaped register arm 86 is pivotally mounted on a pin 88 and actuated by solenoid SOL–2. To facilitate card registration in the optical during multiple scanning cycles, a card locking clutch assembly 75 applies sufficient pressure against the card to prevent the card from being dislodged from the path during the scanning cycle. In order to accomplish this, card locking clutch assembly 75 comprises a card locking clutch member 78 in the form of a cylinder which is hinged on pins 79, 80 journaled for rotation in the card carriage. Card locking clutch member 78 is made of any suitable metal or non-metal material, such as aluminum or rubber. Desirably, the card locking clutch member is formed with a knurled surface to enable good locking contact with the card surface. A torsion spring 89 is formed around pin 88 and applies pressure to card locking clutch member 78. It will be noted that pins 79, 80 are eccentric to the longitudinal axis of the card locking clutch member 78 so that torsion spring 89 may effectively hold the card locking clutch member in card clamping position. A release pin 91 extends from one end of the card locking clutch member and is received by register arm 86 for a purpose to be explained hereinafter. When solenoid SOL–2 is energized to actuate eject rolls 56, the register arm 86 is also actuated and displaced from the path of movement of the ejected card. After the card is ejected the solenoid SOL–2 is deenergized and the arm 58 is removed from the actuated position by the spring 62 and the register arm 86 is returned to its normal position.

In order to project a light image from a microfilm data card supported on the carriage, a rectangular aperture 103 is formed through the platen 74. The aperture 103 is of a dimension slightly in excess of that of the microfilm data area on a card, and is positioned adjacent the data area when the card is positioned on the carriage.

For clamping the microfilm data card in scanning position, there is provided a solenoid actuated projector gate or pressure pad 102 whereby, when the pad is positioned on a card held on the carriage, the pad securely presses the microfilm data area against the platen 74 so that the minified data area is securely pressed in a vertical plane during the scanning operation.

In order to actuate the gate 102 to permit the insertion and removal of microfilm data cards, the pad is pivotally mounted by a pin 97 to the platen 74.

Prior to the actuation of solenoid SOL–1 which actuates the pickerknife 28, solenoid SOL–3 is energized thereby opening the gate 102. The solenoid SOL–3 actuates an arm 93 pivotally secured to the frame which contacts a cam 99 secured to the gate 102. When the solenoid SOL–3 is actuated the gate is pivoted open about the pin 97 by the cam 99.

In operation, the gate 102 is opened by the action of SOL–3, so that a card has an unimpeded passageway onto the card carriage. SOL–2 is actuated moving the register arm 86 out of the path of the card by the action of an offset lever 87 mounted on shaft 61 on a tab member 95 positioned on the register arm. At the same time the register arm 86 is lifted causing release pin 91 to also lift disengaging card locking clutch member 78 from the card by overcoming the force of torsion spring 89. This enables the eject rolls 56 which are moved into contact with the card to eject the card. SOL–2 is then deenergized inactivating the eject rolls 56 and replacing the register arm 86 and card locking clutch member 78 in the path of the card. SOL–1 is then actuated feeding the next card. This card is fed into the feed rolls 40 and 42 and into the carriage 13 against the stop 53. Solenoid SOL–4 then actuates arm 104 pivotally mounted on the housing 44 through opening 106 therein which gives the card a movement and registers the card against the register arm 86 which is formed with an end portion 90 overlapping the end of carriage 13. The plate is restored to closed position when solenoid SOL–3 is deenergized, and a pair of leaf springs 101 clamp the card against the platen 74.

For driving card carriage 13 during the scanning operation, there is provided a driving arrangement for moving the platen 74 and gate 102 at a predetermined, relatively slow speed during the "scan stroke" and at a relatively higher speed during the return stroke of the carriage. For this purpose, there is provided a constant speed belt 110 linked to the main drive (not shown) to effect a predetermined drive rate.

Belt 110 continuously rotates a pulley 114 secured to the shaft 112 which is rotatably mounted in the housing of the projector. The shaft 112 has a second pulley 115 secured thereto and is effective to drive the carriage 13 only during the scanning stroke of the carriage, as described below. A belt 116 is mounted for movement between pulley 115 and a second pulley 118 rotatably mounted on shaft 120 also rotatably secured to the projector housing. Thus the belt drive 116 is continuously moving. To effect engagement of drive belt 116 there is provided a solenoid SOL–5 that is mounted in the frame of the machine and has its armature 122 connected to one end of a lever 124 that is pivotally mounted near its other end on a pin 128 secured in the machine frame. At an extreme end portion 130 of lever 124 adjacent pivot pin 128 there is provided an actuator stop 132 rigidly secured to the carriage 13. When the carriage is to be actuated, the solenoid SOL–5 is energized, to rotate lever 124 clockwise and drive end 130 clockwise to cause the lever 124 to pinch the belt between the end portion 130 thereof and the stop 132 secured to the carriage 13. This action of the lever 124 causes the carriage 13 along with the solenoid SOL–5 and all its related mechanism to be driven along with the belt 116. The carriage is driven past the axis of the optical system at a rate directly proportional to the rotational speed of drum 11 in order to achieve exact synchronism between the moving card and the sensitized surface of the drum. An actuator block 140 is securely mounted on the carriage 13 between a stop 142 and a switch SL–1. As the entire carriage 13 is moved during the scanning stroke the block 140 is moved therewith from the stop 142 to the switch SL–1. Where the block 140 reaches the switch SL–1 an actuating member 144 is contacted thereby actuating the switch. The switch through a proper circuitry deenergizes SOL–5 releasing lever 124 thereby returning the carriage by a spring 148 secured to the frame at one end and to the carriage at the other. The carriage 13 is returned until actuator block 140 contacts the stop 142.

The length of scan can be varied by adjusting the relative position of the stop 142 and switch SL–1. A voltage is set in the control panel according to the size paper and microfilm being used. If the length of scan is to be changed this is determined by the control panel. A signal is sent to a micropositioner which in turn sends a signal to the motor MOT–2. The motor drives the shaft 150 through the gear train 152 and this right and left-hand threaded shaft 150 will either move the stop 142 and switch SL–1 which are threaded on the shaft 150 toward or away from each other increasing or decreasing the distance between them thereby setting the length of scan. A gear 158 drives a linear potentiometer 151. The linear potentiometer will match the voltage setup in the micropositioner and stop the motor when they are equal.

Above is described card handling apparatus for use in a recording machine capable of automatically feeding, positioning, and ejecting record cards containing microfilm during a scanning operation for producing single or multiple prints without detracting from the overall image quality. Heretofore record cards on a moving carriage would tend to move out of the optical path during the scanning operation. Hence portions of the film would be missed and/or projected out of optical alignment. It can readily be appreciated that a card handling apparatus obviating these problems is greatly desired and very much improves automatic recording machines especially in the microfilm reproduction field.

While the invention has been described with reference to the structure disclosed herein, it is not confined to the details set forth; and this application is intended to cover such modifications or changes as may come within the purposes of the improvements or the scope of the following claims.

What is claimed is:

1. In an automatic card handling apparatus of the type used to position and support data cards containing microfilm mounted in an aperture therein in a light path of an optical projector during scanning and including a card carriage movable to intercept the light path of the projector and card transport means to feed and then eject each card after the desired number of scans, the improvement comprising a card locking clutch assembly to prevent relative movement of the microfilm aligned in the optical path during movement of the carriage including a carriage mounted for movement transverse to the optical axis of an optical path, said carriage including a platen and an actuable gate member movable toward and away from said platen for receiving a data card containing microfilm mounted in an aperture to be scanned therebetween, said gate member being formed with an elongated opening adjacent to the microfilm, a cylindrical card locking clutch member positioned in said opening and mounted for rotation on axis eccentric to the longitudinal axis thereof, a pin member journaled for rotation on said gate member, a torsion spring secured to said pin member and connected at one end to said card locking clutch member to urge said clutch member into contact with said card received by said gate and said platen whereby relative movement between said card and the optical path during movement of the carriage is substantially prevented during a scan cycle, a clutch release pin positioned on said card locking clutch member eccentric to the longitudinal axis thereof, and means operatively associated with said clutch release pin to move said release pin in a direction to disengage said card locking clutch member against the force of said torsion spring to enable said card to be ejected from said carriage after a predetermined time interval.

2. Apparatus according to claim 1 wherein said last mentioned means is operatively associated with card eject means.

3. Apparatus according to claim 1 wherein said card locking clutch member is formed with a knurled surface.

4. Apparatus according to claim 1 wherein said last mentioned means includes an arm member formed with an elongated edge portion in overlapping relation at one end of said carriage to guide said card onto said carriage in optical alignment with said optical path.

References Cited

UNITED STATES PATENTS

| | | | |
|---|---|---|---|
| 3,405,996 | 10/1968 | Novak | 353—27X |
| 3,409,361 | 11 1968 | Hynes et al. | 353—27X |
| 3,424,524 | 1/1969 | Akiyama et al. | 353—27X |
| 3,446,552 | 5/1969 | Gross et al. | 353—27 |

WILLIAM D. MARTIN, JR., Primary Examiner